US012772956B2

(12) United States Patent
Grossaint et al.

(10) Patent No.: US 12,772,956 B2
(45) Date of Patent: Oct. 27, 2026

(54) QUICK-RELEASE TETHER APPARATUS

(71) Applicants: Colton Grossaint, West Valley City, UT (US); Keaton Grossaint, West Valley City, UT (US)

(72) Inventors: Colton Grossaint, West Valley City, UT (US); Keaton Grossaint, West Valley City, UT (US)

( * ) Notice: Subject to any disclaimer, the term of this patent is extended or adjusted under 35 U.S.C. 154(b) by 232 days.

(21) Appl. No.: 18/631,982

(22) Filed: Apr. 10, 2024

(65) Prior Publication Data

US 2025/0318498 A1 Oct. 16, 2025

(51) Int. Cl.
*A01K 1/06* (2006.01)

(52) U.S. Cl.
CPC .................................... *A01K 1/06* (2013.01)

(58) Field of Classification Search
CPC ........... A01K 1/06; A01K 1/04; A01K 27/005
See application file for complete search history.

(56) References Cited

U.S. PATENT DOCUMENTS

| | | | | |
|---|---|---|---|---|
| 4,358,880 | A * | 11/1982 | Garcia | F16B 45/023 24/600.2 |
| 4,733,625 | A | 3/1988 | Allen | |
| 4,903,638 | A * | 2/1990 | Lacey | F16B 45/021 119/776 |
| 5,174,246 | A * | 12/1992 | Driver | A01K 27/005 119/795 |
| 5,463,884 | A * | 11/1995 | Woo | E05B 75/00 70/16 |
| 5,769,475 | A * | 6/1998 | Tylaska | F16G 15/04 24/601.5 |
| 5,771,843 | A | 6/1998 | Karlin | |
| 6,457,896 | B1 | 10/2002 | DeDoes | |
| 7,389,750 | B1 * | 6/2008 | Rogers | A01K 27/005 119/792 |
| D644,095 | S | 8/2011 | Underwood | |
| 8,348,317 | B1 * | 1/2013 | Bird | B65G 7/12 294/902 |
| 9,284,181 | B1 * | 3/2016 | Nieslanik | A01K 27/005 |
| 10,036,448 | B1 * | 7/2018 | Robinson | A01K 1/04 |
| 10,995,791 | B1 * | 5/2021 | Chen | F16B 21/073 |
| 11,330,802 | B1 * | 5/2022 | Yin | F16B 45/06 |
| 11,889,816 | B1 * | 2/2024 | Miller | A01K 27/004 |
| 2004/0211371 | A1 | 10/2004 | Schofield | |
| 2010/0175228 | A1 * | 7/2010 | Slank | A01K 27/005 24/490 |
| 2010/0229357 | A1 * | 9/2010 | Sample | F16B 45/034 24/601.5 |
| 2014/0143986 | A1 * | 5/2014 | Genova | A01K 27/005 24/369 |
| 2018/0374395 | A1 * | 12/2018 | Johnston | A01K 27/003 |

FOREIGN PATENT DOCUMENTS

| | | |
|---|---|---|
| CA | 3021261 | 4/2020 |

* cited by examiner

*Primary Examiner* — David M Upchurch

(57) ABSTRACT

A securement apparatus for tethering an animal to a structure includes an eyelet sized and a clamp which are coupled together. The eyelet is sized to receive a lead rope therethrough and slide freely along the rope. The clamp is sized and configured to attach to the lead rope distally from the eyelet. The clamp cinches onto the lead rope to inhibit sliding along the lead rope.

13 Claims, 8 Drawing Sheets

QUICK-RELEASE TETHER APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to lead tethers and more particularly pertains to a new lead tether for tethering an animal to a structure.

(2) Description of Related Art Including Information Disclosed Under 37 CFR 1.97 and 1.98

The prior art describes various devices for tethering an animal to an anchoring structure, including those with quick-release or breakaway couplings which allow a user or the animal to safely disconnect from the anchoring structure without damaging the structure or injuring itself. Some devices of the prior art also couple two distal sections of a lead rope together on one side of the anchoring structure to loop the rope around the anchoring structure and secure the animal to the structure. However, the prior art fails to describe an apparatus which has an eyelet which slides along a lead rope and a clamp which frictionally secures to the lead rope such that the rope may be looped around and secured to such an anchoring structure. The prior art also fails to describe such an apparatus which has a quick-release mechanism that cannot be used by the animal but which can be disengaged by a user to release the animal from the anchoring structure.

BRIEF SUMMARY OF THE INVENTION

An embodiment of the disclosure meets the needs presented above by generally comprising an eyelet sized and a clamp which are coupled together. The eyelet is sized to receive a lead rope therethrough and slide freely along the rope. The clamp is sized and configured to attach to the lead rope distally from the eyelet. The clamp cinches onto the lead rope to inhibit sliding along the lead rope.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
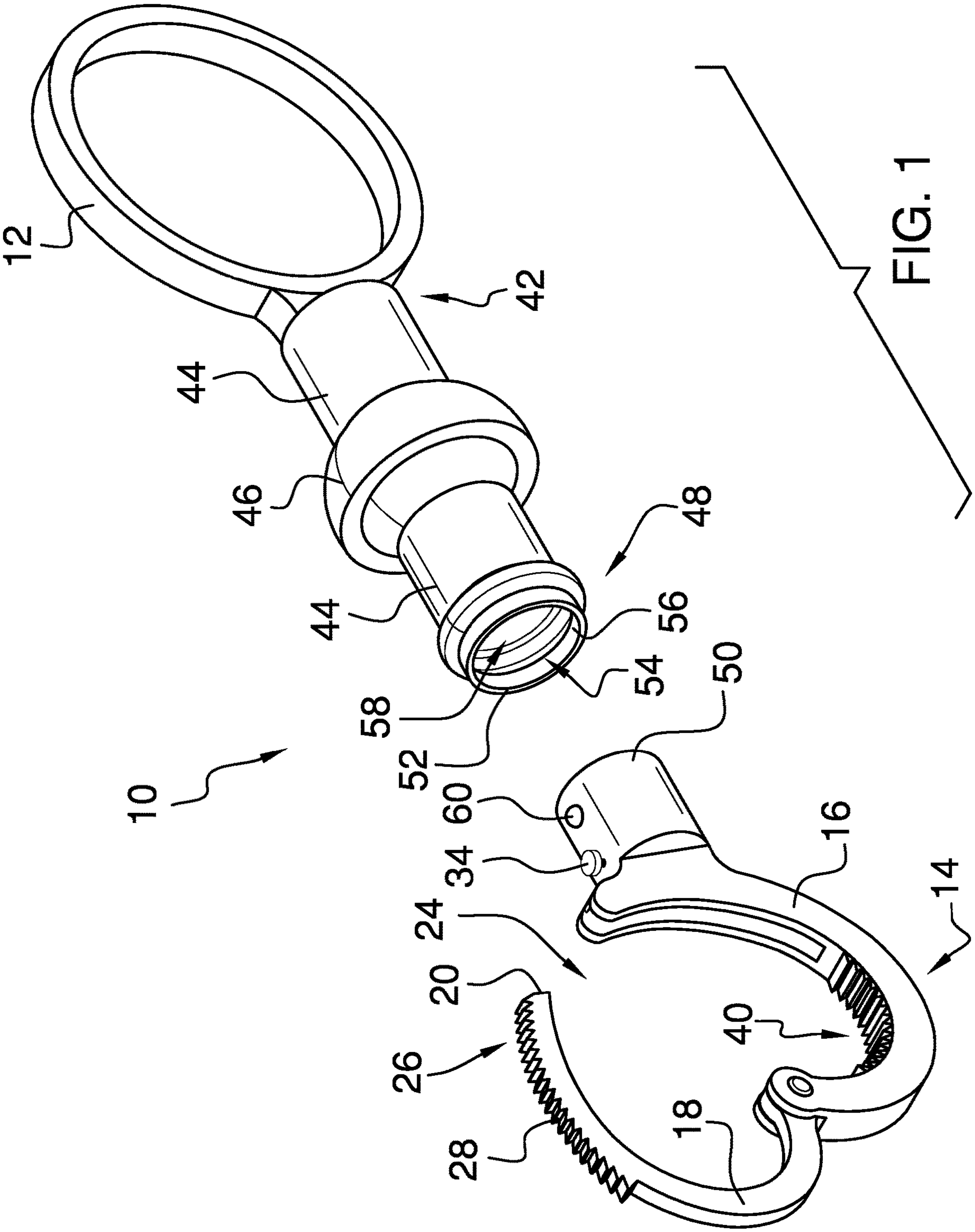
FIG. 1 is a perspective exploded view of a securement apparatus according to an embodiment of the disclosure.
Figure 2:
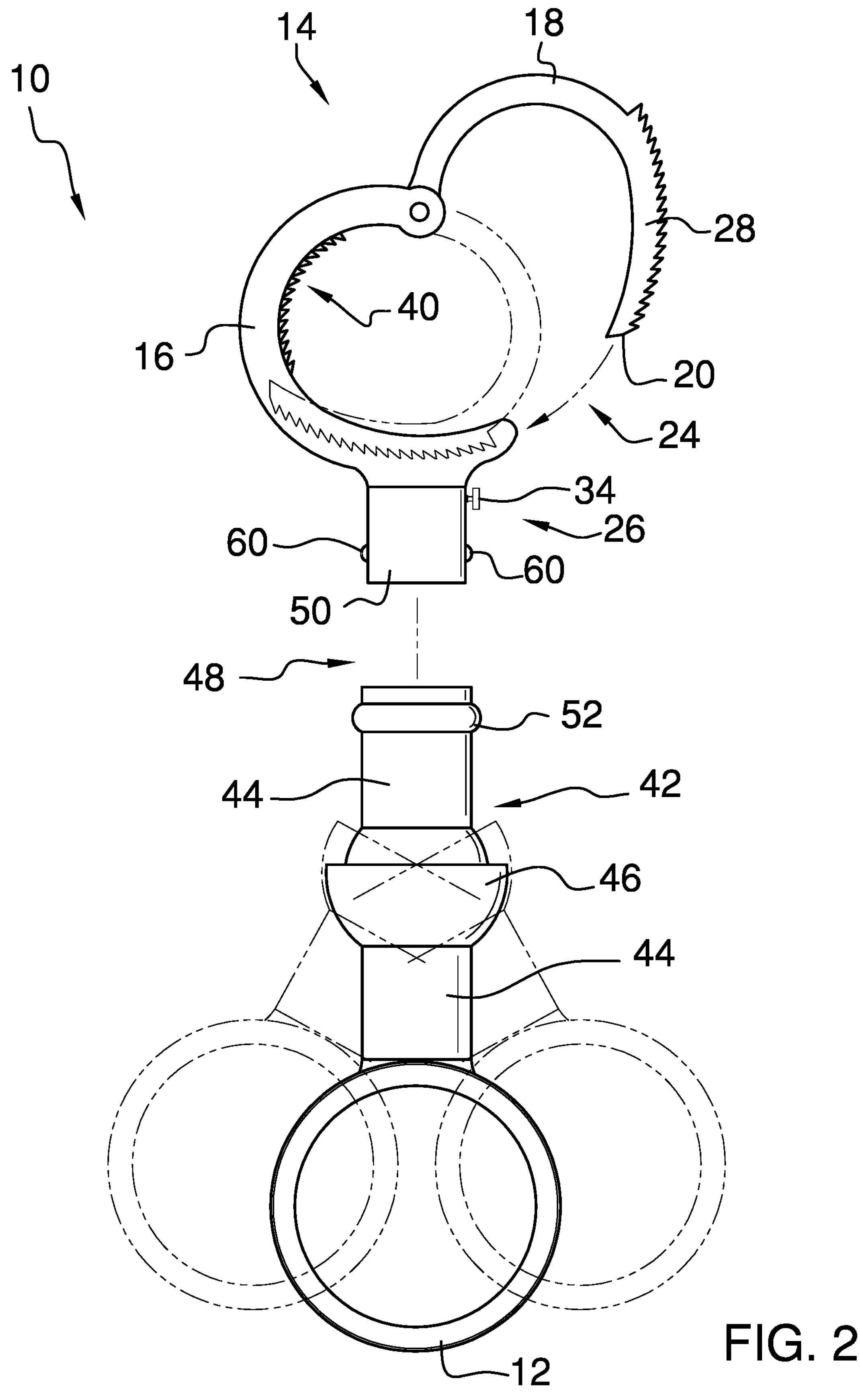
FIG. 2 is a front exploded view of an embodiment of the disclosure.
Figure 3:
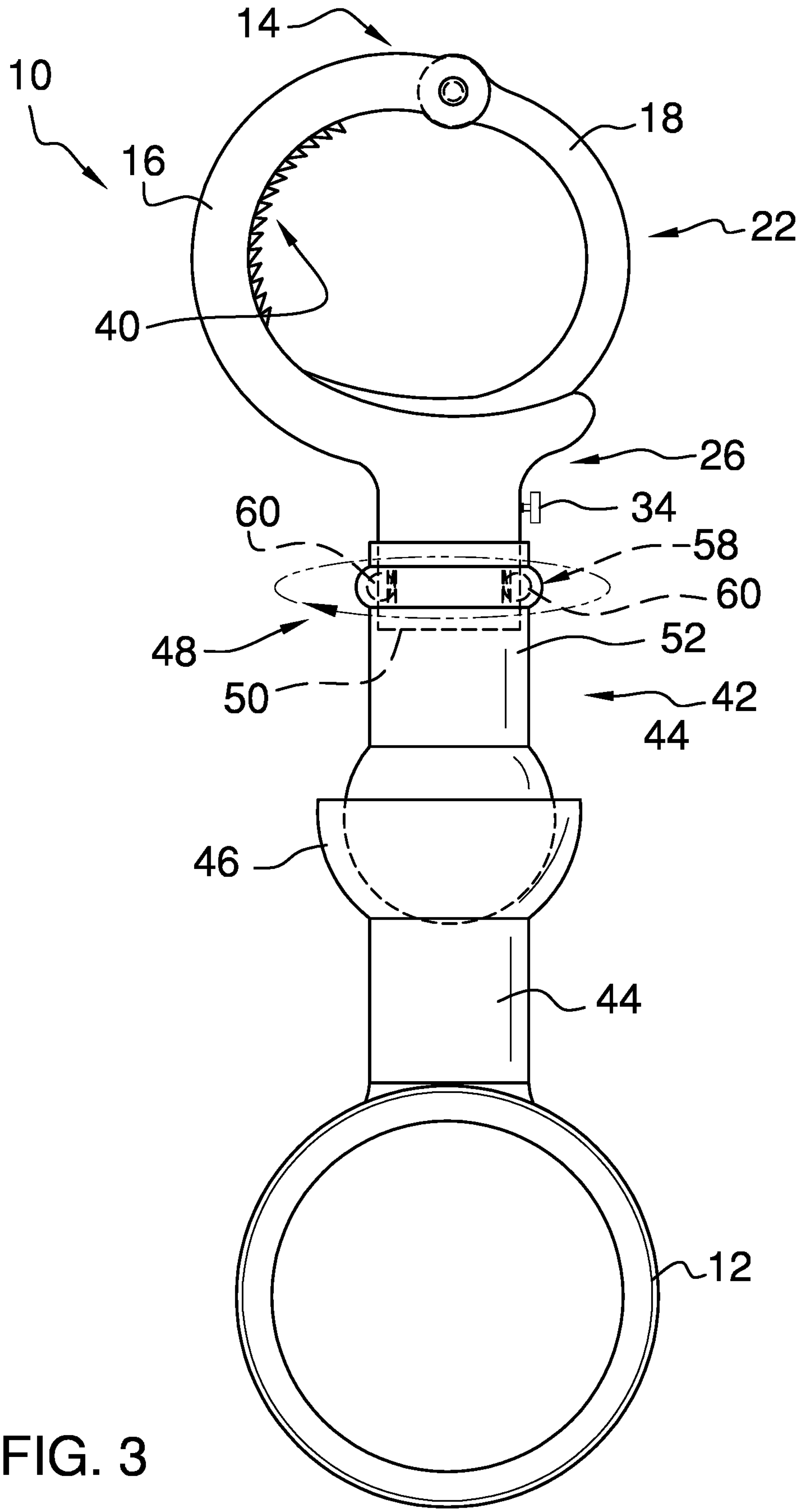
FIG. 3 is a front view of an embodiment of the disclosure.
Figure 4:
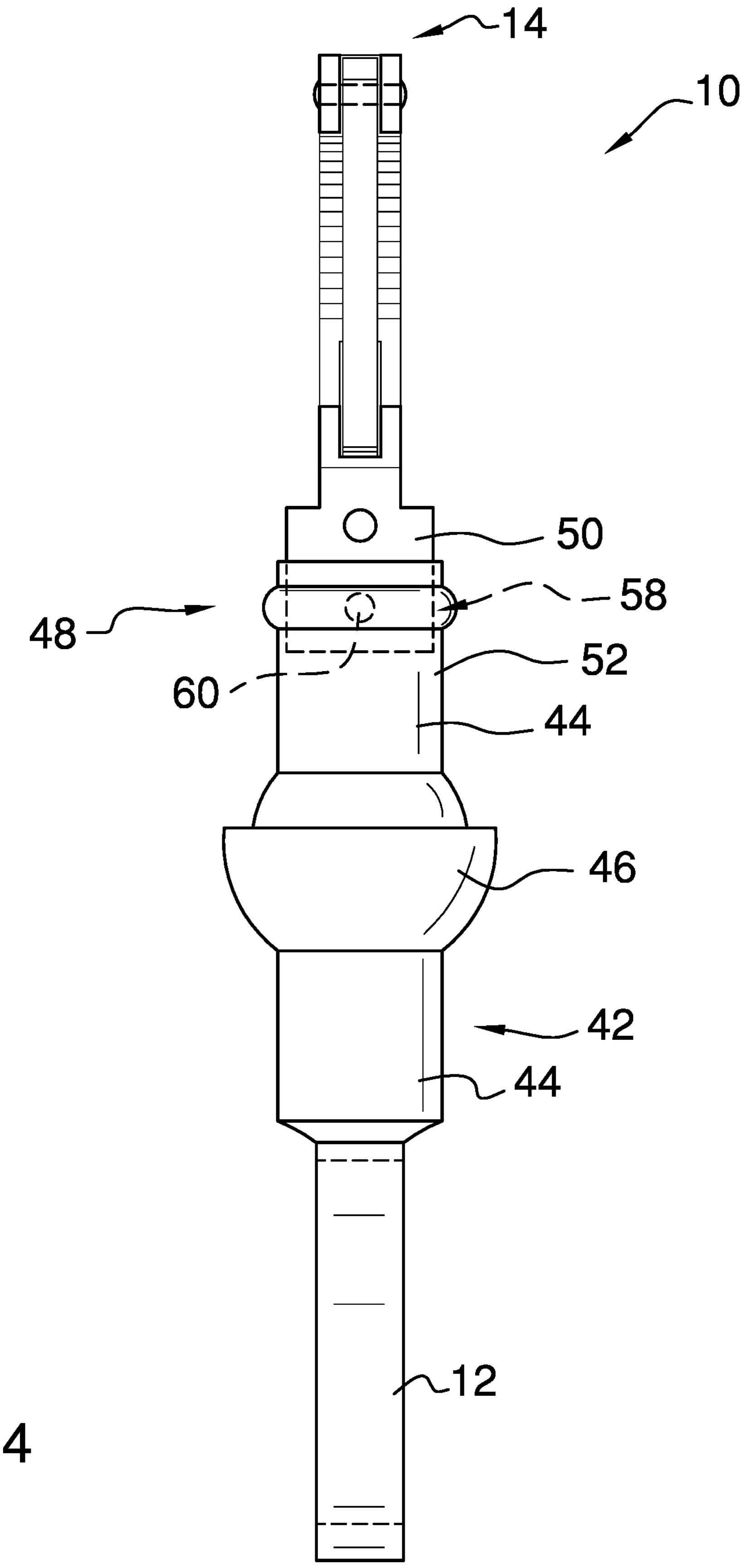
FIG. 4 is a side view of an embodiment of the disclosure.
Figure 5:
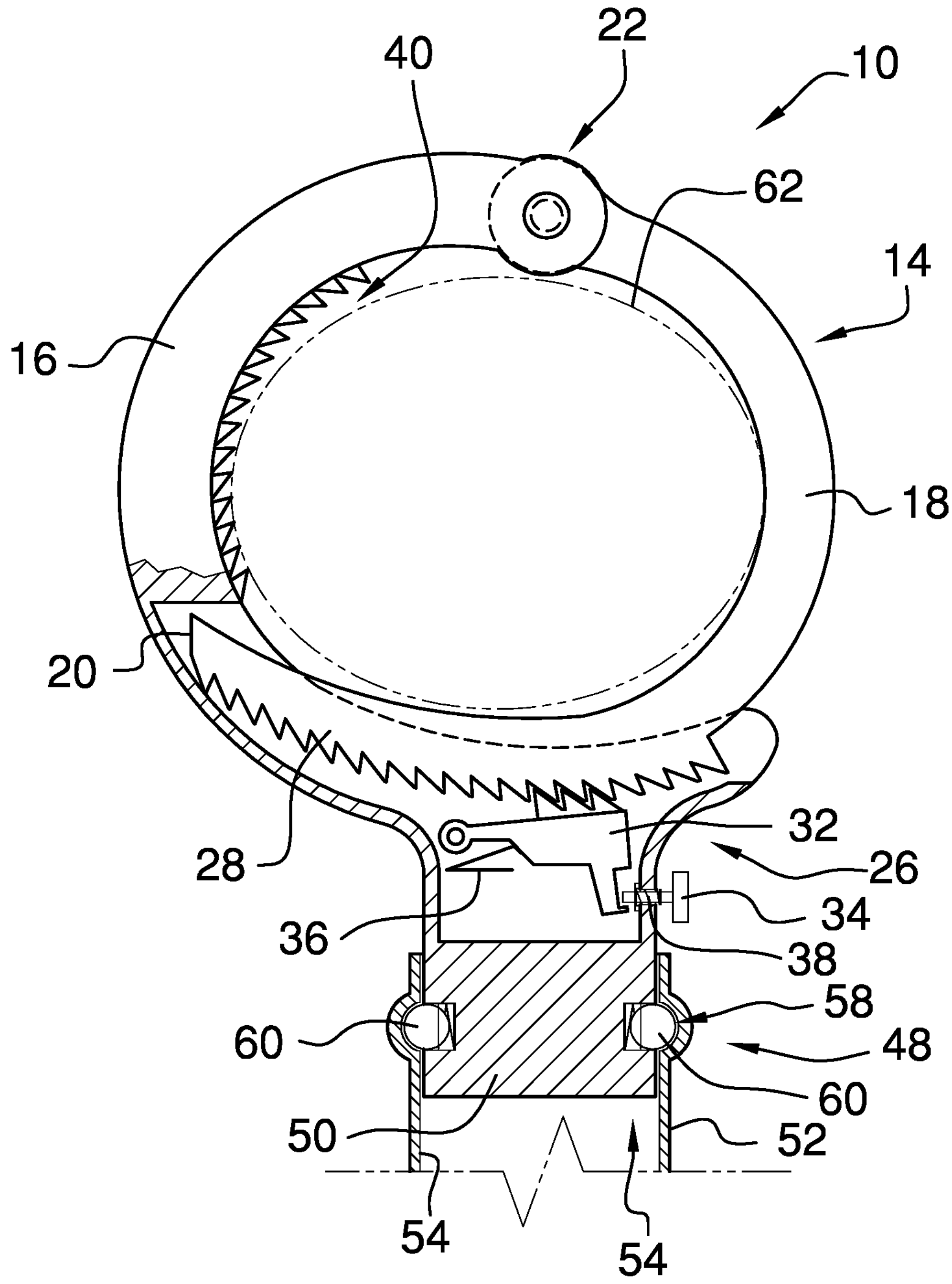
FIG. 5 is a detail view of an embodiment of the disclosure with a partial cross section. A clamp is shown in a closed position.
Figure 6:
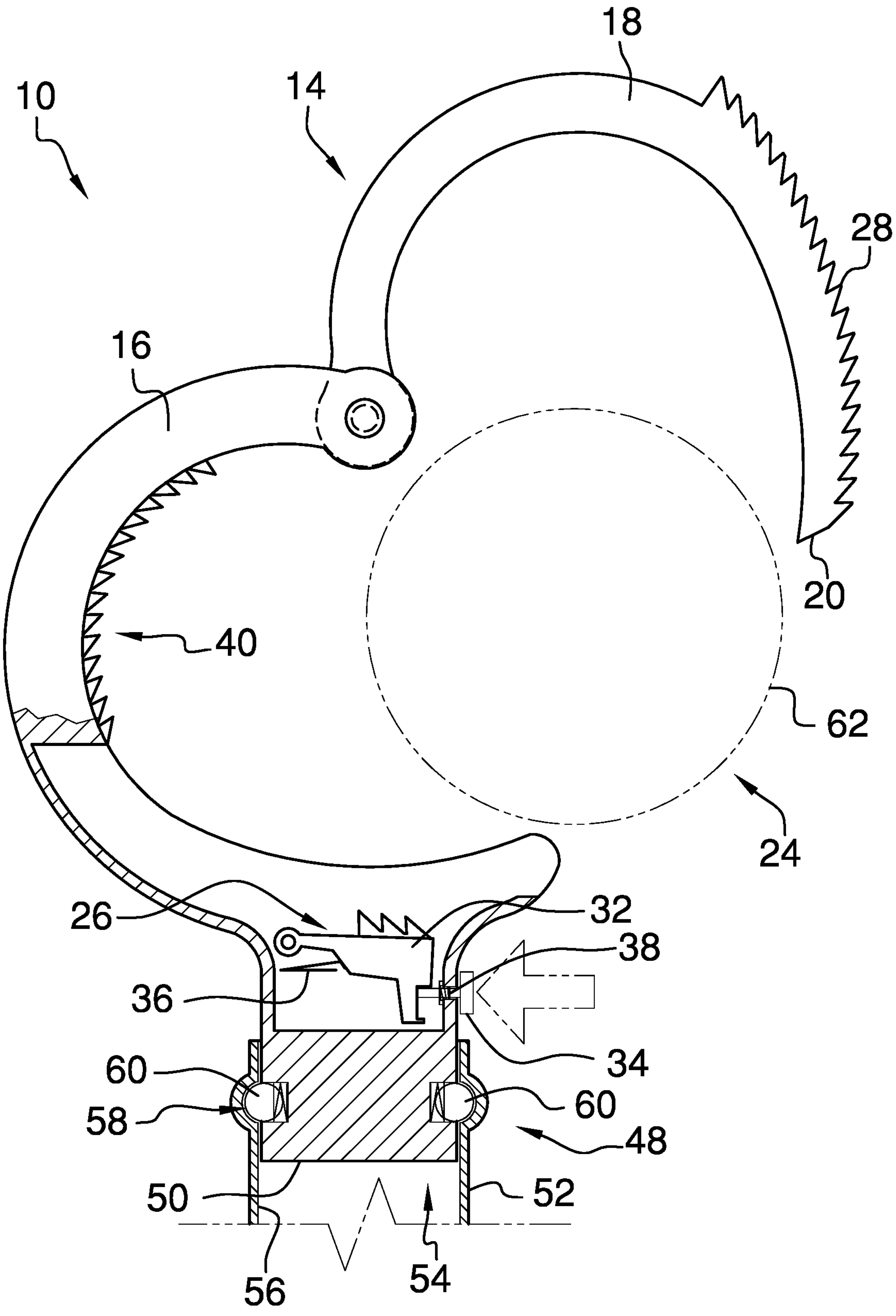
FIG. 6 is another detail view of an embodiment of the disclosure with a partial cross section. A clamp is shown in an open position.
Figure 7:
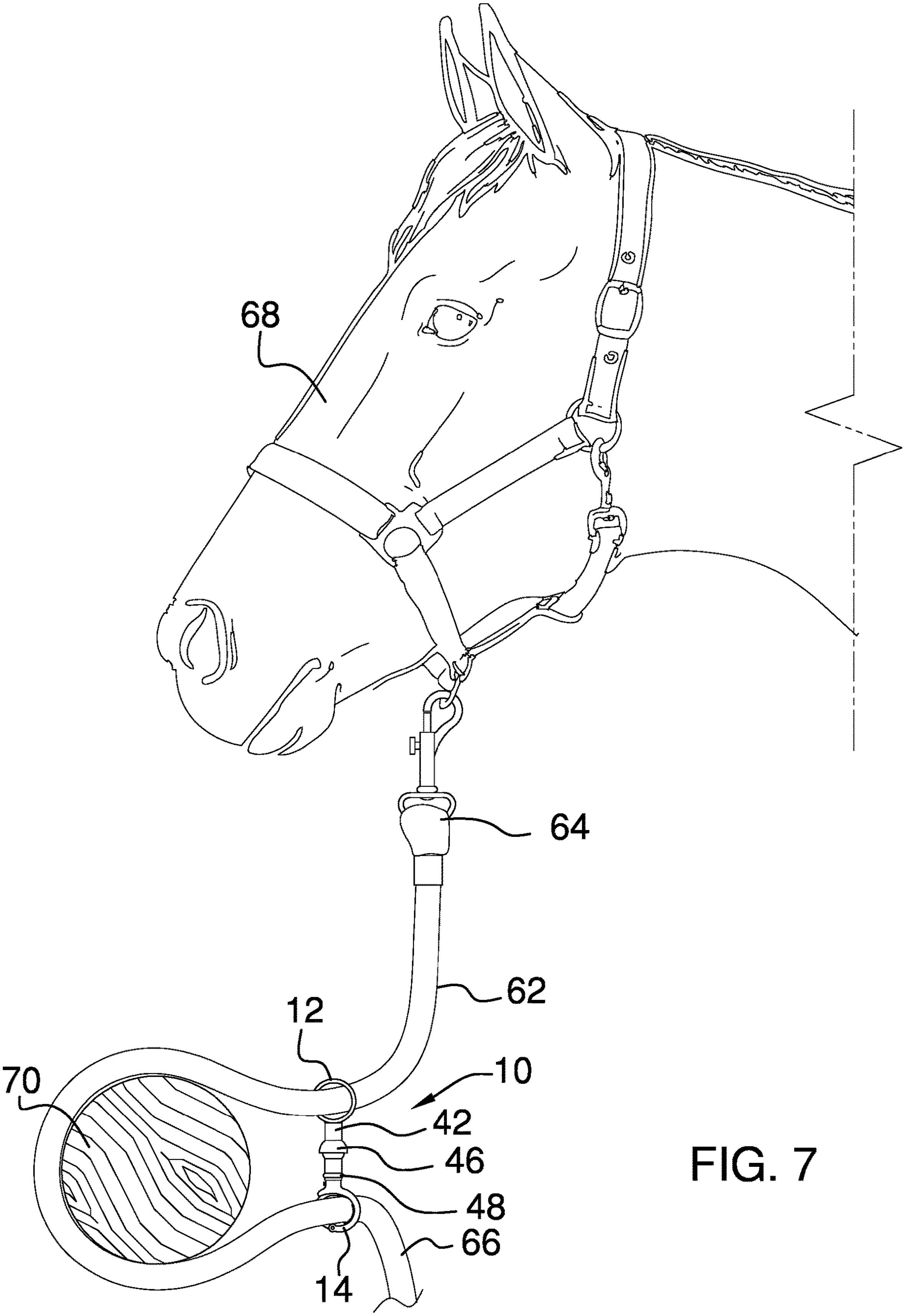
FIG. 7 is an in-use view of an embodiment of the disclosure.
Figure 8:
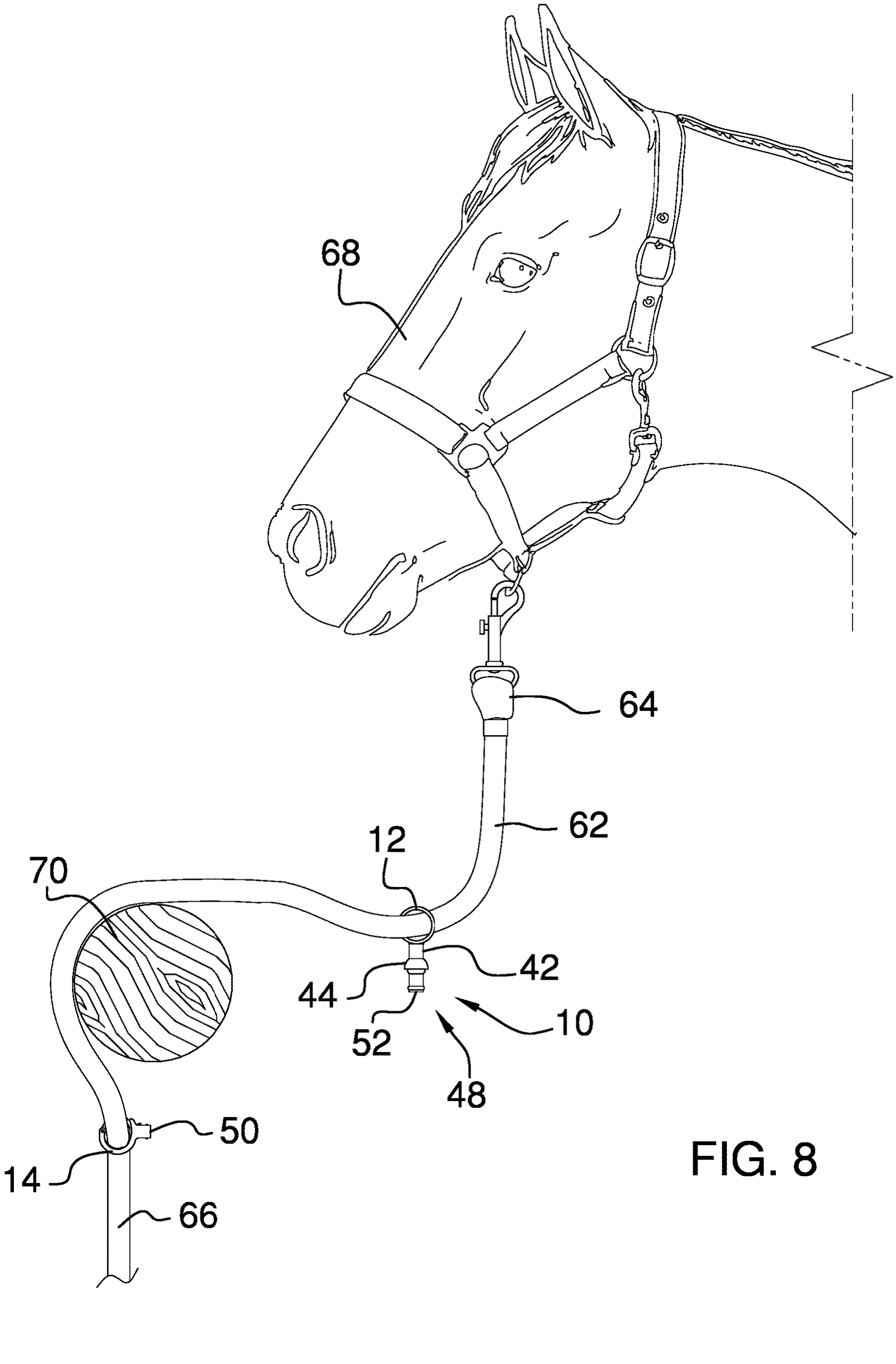
FIG. 8 is an in-use view of an embodiment of the disclosure.

With reference now to the drawings, and in particular to FIGS. 1 through 8 thereof, a new lead tether embodying the principles and concepts of an embodiment of the disclosure and generally designated by the reference numeral 10 will be described.

As best illustrated in FIGS. 1 through 8, the securement apparatus 10 generally comprises an eyelet 12 and a clamp 14 which are coupled together. The eyelet 12 is sized to receive a lead rope 62 therethrough and freely slide along the lead rope 62. The clamp 14 is sized to attach to the lead rope 62 distally from the eyelet 12. The clamp 14 comprises a base member 16 and a pivot member 18. The pivot member 18 is pivotally coupled to the base member 16 and may be positioned in a closed position 22 with respect to the base member 16 to form a closed loop with the base member 16. When closed, the base and pivot members 16, 18 may cinch the lead rope 62 therebetween. The pivot member 18 may be pivoted to move a distal end 20 of the pivot member 18 with respect to the base member 16 away from the base member 16, forming a gap 24 to release the lead rope 62.

The clamp 14 also includes a locking mechanism 26 which is operable to secure the pivot member 18 to the base member 16 in the closed position 22. The locking mechanism 26 is a ratchet which comprises a rack 28 and a pawl 32. The rack 28 is mounted on the pivot member 18, and the pawl 32 is mounted in the base member 16. The pawl 32 is biased to engage teeth of the rack 28 when the pivot member 18 is positioned in the closed position 22 to obstruct the pivot member 18 from moving out of the closed position 22. A release button 34 is mounted on the base member 16 and moveable against the pawl 32 to urge the pawl 32 against bias to disengage the pawl 32 from the rack 28. With the release button 34 depressed, the clamp 14 may be opened to release the lead rope 62. A pawl spring 36 biases the pawl 32, and a button spring 38 biases the button away from the pawl 32. Other biasing means may be used for the pawl 32 and the release button 34 such as elastic bands, magnets, or any other suitable means.

The ratchet also facilitates adjusting a position of the pivot member 18 with respect to the base member 16 to adjust a grip of the clamp 14 on the lead rope 62. The clamp 14 may be adjusted via the ratchet to allow some movement of the lead rope 62 through the clamp 14 given a sufficient force to overcome the friction between the clamp 14 and the lead rope 62. Gripping teeth 40 mounted on an interior side of the base member 16 engage the lead rope 62 to enhance the grip of the clamp 14 on the lead rope 62. Other frictional enhancements may also be used, including a roughened surface, a material selected to have a high coefficient of friction with the material of the lead rope 62, or the like. Other locking mechanism 26*s* may be used such as locking pins, set screws, latches, or the like.

A connecting rod 42 is coupled to and extends between the eyelet 12 and the clamp 14. A pivot joint 46 such as a knuckle joint, a ball joint, or the like is mounted to the connecting rod 42, breaking the connecting rod 42 into a pair of sections 44 which are pivotable with respect to each other. A quick-release mechanism 48 releasably couples the clamp 14 to the connecting rod 42 and is configured to permit release of the clamp 14 from the connecting rod 42 upon a sufficient pulling force is applied to the clamp 14 away from the connecting rod 42.

The quick-release mechanism 48 comprises an insertion member 50 coupled to the clamp 14 and a receiver 52 coupled to the connecting rod 42. The receiver 52 defines a slot 54 sized to receive the insertion member 50. The insertion member 50 moves in a direction substantially coplanar to an opening formed by the closed loop of the clamp 14 to insert into the receiver 52. The quick-release mechanism 48 also includes a pair of detents 60 which are mounted to the insertion member 50. The detents 60 are biased to engage the receiver 52 by extending into a groove 58 on an inner surface 56 of the slot 54 of the receiver 52. The groove 58 has an annular shape to facilitate rotating the insertion member 50, and thus the clamp 14, with respect to the connecting rod 42.

In use, the securement apparatus 10 may be applied to secure an animal 68 such as a horse to an anchoring member 70, such as a fence post, rail, or other suitable structure. With a first end 64 of the lead rope 62 attached to the animal 68, a second end 66 of the lead rope 62 is threaded through the eyelet 12 and wrapped around the anchoring member 70. Then the clamp 14 is applied to the lead rope 62 to form a closed hitching loop around the anchoring member 70 with the lead rope 62 and the securement apparatus 10. If desired, the clamp 14 may be adjusted to allow some of the lead rope 62 to pass through the clamp 14 when the animal 68 pulls on the first end 64 of the lead rope 62. To prevent any of the lead rope 62 passing through the clamp 14, the clamp 14 may be cinched very tightly, or a knot may be formed in the lead rope 62 next to the clamp 14 so that the knot engages the side of the clamp 14 when the first end 64 of the lead rope 62 is pulled. The pivot joint 46 allows the securement apparatus 10 to bend for added maneuverability when securing the securement apparatus 10 to the lead rope 62.

While the animal 68 may conceivably remove the clamp 14 from the connecting rod 42 by applying the sufficient pulling force to the clamp 14 given the right leverage, disconnection via the quick-release mechanism 48 is made less likely by the manner in which the clamp 14 holds onto the lead rope 62. If the clamp 14 is cinched relatively loosely, the lead rope 62 will slide through the clamp 14 rather than disconnecting the quick-release mechanism 48. If the clamp 14 is cinched relatively tightly, the lead rope 62 will pull the clamp 14 generally perpendicular to the direction the insertion member 50 of the quick-release mechanism 48 would need to travel relative to the receiver 52 to disengage from the receiver 52. In either case, disengagement of the quick-release mechanism 48 by the animal 68 is unlikely.

In some situations, the animal 68 may panic and pull on the lead rope 62, risking damage to the anchoring member 70 and injury to itself. When this occurs, or a user otherwise wishes to quickly disengage the animal 68 from the anchoring member 70, the user applies the sufficient pulling force to the clamp 14 away from the connecting rod 42. If disengaged in this way, the clamp 14 remains on the lead rope 62 via the cinching action, and the clamp 14 retains the eyelet 12 on the rope by stopping the eyelet 12 from sliding past the clamp 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A securement apparatus for securing an animal to an anchoring object, the apparatus comprising:

an eyelet sized and configured to receive a lead rope therethrough;

a clamp coupled to the eyelet, the clamp being sized and configured to attach to the lead rope distally from the eyelet; and wherein the clamp is frictionally enhanced on an interior side of the clamp, the clamp being configured to engage the lead rope to inhibit sliding of the clamp along the lead rope.

2. The apparatus of claim 1, wherein the clamp comprises a base member and a pivot member, the pivot member being pivotally coupled to the base member, the pivot member being positionable in a closed position with respect to the base member wherein a distal end of the pivot member with respect to the base member engages the base member, the base and pivot members forming a closed loop when the pivot member is positioned in the closed position, the clamp being configured to cinch the lead rope between the base and pivot members when the pivot member is in the closed position.

3. The apparatus of claim 2, wherein the clamp further comprises a locking mechanism operable to secure the pivot member to the base member in the closed position.

4. A securement apparatus for securing an animal to an anchoring object, the apparatus comprising:

an eyelet sized and configured to receive a lead rope therethrough;

a clamp coupled to the eyelet, the clamp being sized and configured to attach to the lead rope distally from the eyelet;

wherein the clamp comprises a base member and a pivot member, the pivot member being pivotally coupled to the base member, the pivot member being positionable in a closed position with respect to the base member wherein a distal end of the pivot member with respect to the base member engages the base member, the base and pivot members forming a closed loop when the pivot member is positioned in the closed position, the clamp being configured to cinch the lead rope between the base and pivot members when the pivot member is in the closed position;

wherein the clamp further comprises a locking mechanism operable to secure the pivot member to the base member in the closed position; and wherein the locking mechanism comprises a rack and a pawl, the rack being mounted on the pivot member, the pawl being mounted in the base member, the pawl being biased to engage teeth of the rack when the pivot member is positioned in the closed position to obstruct the pivot member from moving out of the closed position.

5. The apparatus of claim 4, wherein the locking mechanism further comprises a release button which is operable to disengage the pawl from the rack.

6. The apparatus of claim 5, wherein the release button is mounted on the base member and is moveable against the pawl to urge the pawl against bias.

7. The apparatus of claim 1, wherein the clamp further comprises gripping teeth mounted on an interior side of the clamp, the gripping teeth being configured to engage the lead rope to inhibit sliding of the clamp along the lead rope.

8. The apparatus of claim 1, further comprising a connecting rod being coupled to and extending between the eyelet and the clamp.

9. The apparatus of claim 8, further comprising a pivot joint mounted to the connecting rod and breaking the connecting rod into a pair of sections which are pivotable with respect to each other.

10. The apparatus of claim 8, further comprising a quick-release mechanism releasably coupling the clamp to the connecting rod, the quick release mechanism being configured to permit release of the clamp from the connecting rod upon a sufficient pulling force being applied to the clamp away from the connecting rod.

11. The apparatus of claim 10, wherein the quick-release mechanism comprises:

an insertion member coupled to the clamp;

a receiver coupled to the connecting rod, the receiver defining a slot sized to receive the insertion member, the receiver defining a groove on an inner surface of the slot; and at least one detent mounted to the insertion member and biased to engage the groove of the receiver when the insertion member is inserted into the slot of the receiver.

12. The apparatus of claim 11, wherein:

the groove having an annular shape; and the at least one detent is slidable along the groove such that the clamp is rotatable with respect to the connecting rod.

13. A securement apparatus for securing an animal to an anchoring object, the apparatus comprising:

an eyelet sized and configured to receive a lead rope therethrough;

a clamp coupled to the eyelet, the clamp being sized and configured to attach to the lead rope distally from the eyelet, the clamp comprising:

a base member and a pivot member, the pivot member being pivotally coupled to the base member, the pivot member being positionable in a closed position with respect to the base member wherein a distal end of the pivot member with respect to the base member engages the base member, the base and pivot members forming a closed loop when the pivot member is positioned in the closed position, the clamp being configured to cinch the lead rope between the base and pivot members when the pivot member is in the closed position;

a locking mechanism operable to secure the pivot member to the base member in the closed position, the locking mechanism comprising a rack and a pawl, the rack being mounted on the pivot member, the pawl being mounted in the base member, the pawl being biased to engage teeth of the rack when the pivot member is positioned in the closed position to obstruct the pivot member from moving out of the closed position, the locking mechanism further comprising a release button operable to disengage the pawl from the rack, the release button being mounted on the base member and moveable against the pawl to urge the pawl against bias; and gripping teeth mounted on an interior side of the base member, the gripping teeth being configured to engage the lead rope to inhibit sliding of the clamp along the lead rope;

a connecting rod being coupled to and extending between the eyelet and the clamp;

a pivot joint mounted to the connecting rod and breaking the connecting rod into a pair of sections which are pivotable with respect to each other; and a quick-release mechanism releasably coupling the clamp to the connecting rod, the quick release mechanism being configured to permit release of the clamp from the connecting rod upon a sufficient pulling force being applied to the clamp away from the connecting rod, the quick-release mechanism comprising:

an insertion member coupled to the clamp;

a receiver coupled to the connecting rod, the receiver defining a slot sized to receive the insertion member, the receiver defining a groove on an inner surface of the slot, the groove having an annular shape; and a pair of detents mounted to the insertion member and biased to engage the groove of the receiver when the insertion member is inserted into the slot of the receiver, the pair of detents being slidable along the groove such that the clamp is rotatable with respect to the connecting rod.

* * * * *